April 14, 1964 A. B. CHASE 3,129,428
SAFETY CIRCUIT FOR TRANSISTOR AMPLIFIER
Filed Nov. 16, 1959

INVENTOR.
ALLEN B. CHASE
BY Carl W. Laumann, Jr.
ATTORNEY

United States Patent Office
3,129,428
Patented Apr. 14, 1964

3,129,428

SAFETY CIRCUIT FOR TRANSISTOR AMPLIFIER

Allen B. Chase, San Jose, Calif., assignor to International Business Machines Corporation, New York, N.Y., a corporation of New York Filed Nov. 16, 1959, Ser. No. 853,334
2 Claims. (Cl. 346—74)

Figure 1:
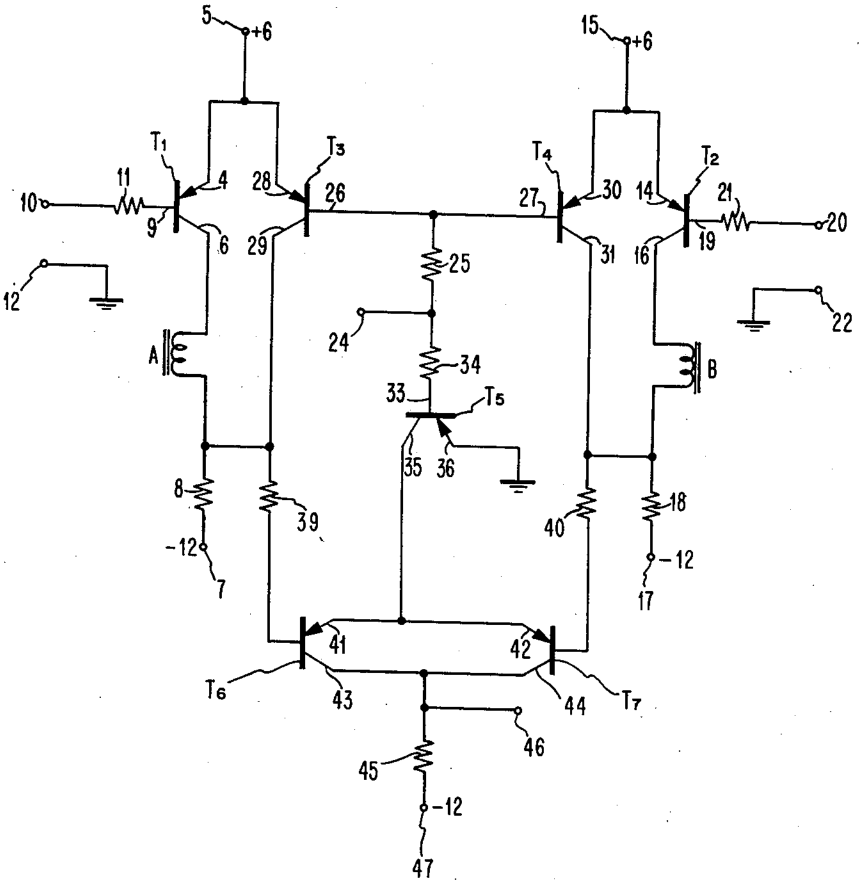

This invention relates generally to protective means for transistor amplifiers and in particular to protective means for transistor amplifiers used in magnetic recording systems.

Widespread adoption of transistors has resulted from the advantages these devices have over the conventional vacuum tube. However transistors possess certain undesirable characteristics which have prevented its application to critical problems. One such application is the amplifier or switch which controls the current flowing in the transducer or write winding of a magnetic recording system. Failure of the transistor to function properly in this application could result in the loss of recorded data, since the current through the write winding as a result of a transistor failure will erase the recording medium. Although the reliability of transistors has been greatly improved, the possible loss of even a small amount of recorded data has prevented the use of transistors in this situation. Prior art protective systems have generally incorporated mechanical devices such as relays which have the limitations inherent in mechanical movements such as slow response time and contact wear. These limitations have made mechanical protective systems generally undesirable. To permit the use of transistors while retaining the fail-safe features of prior art devices, this invention provides a compatible protective system in which the failure of the write winding transistor amplifier does not result in the loss of recorded data. This is accomplished by providing a transistor in parallel with the circuit to be protected and controlling the impedance of the protective transistor to provide an alternate path of relatively low resistance when protection is desired. Further protection is afforded by providing a circuit wherein the protective system is monitored and any failure is immediately noted.

It is therefore an object of my invention to provide a transistor amplifier which is fail-safe.

Another object of my invention is to provide for the control of current in the write winding of a recording system by a transistorized circuit which avoids the limitations of prior art systems.

Still another object of my invention is to provide compatible protection for a transistor amplifier.

It is still another object of my invention to provide a fail-safe transistor amplifier wherein the loss of protection is immediately indicated.

The foregoing and other objects, features and advantages of the invention will be apparent from the following more particular description of a preferred embodiment of the invention, as illustrated in the accompanying drawing.

The drawing shows a NRZI recording system which embodies my invention. This system is adapted to the recording of binary data on a magnetic record and indicates a "1" by change in the polarity of the recording flux. A "0" is indicated by no change in the recording flux. This system is also known as the modified non-return to zero method of recording and is described at pages 330–331 of "Digital Computer Components and Circuits" by R. K. Richards, D. Van Nostrand Company, Inc., Princeton, New Jersey.

Two windings are used on the recording head. Conventional circuitry which is not shown provides means for alternating current flow from one winding to the other when it is desired to record a "1" and for holding the same winding energized when a "0" is to be recorded.

With reference to the drawing, current to write head winding A is controlled by transistor $T_1$, having an emitter 4 collected to a source of current 5. Transistor $T_1$ has collector 6 connected to one side of winding A. The other side of winding A is connected to a source of current 7 through resistor 8. Base 9 of transistor $T_1$ is connected to input terminal 10 through resistor 11. Input terminal 12 is connected to ground. In the absence of a signal across input terminals 10 and 12, current flow in the emitter-collector circuit of transistor $T_1$ and series connected winding A will be essentially zero.

As mentioned previously, the NRZI system requires a flux change to be effected when a "1" is to be recorded. To accomplish this without reversing current through winding A, a second winding B is used on the write head. Current flow through winding B is such that it induces a magnetic flux in the recording medium opposite in polarity to that of winding A.

Transistor $T_2$ controls the flow of current through winding B in the same manner that transistor $T_1$ controls the current flowing through winding A. Emitter 14 of transistor $T_2$ is connected to a source of current 15 and collector 16 is connected to one end of winding B. The other end of winding B is connected to a source of current 17 through resistor 18. Base 19 of transistor $T_2$ is connected to input terminal 20 through resistor 21. Input terminal 22 is connected to ground.

Since transistor $T_2$ has its emitter 14 and collector 16 connected in series with write coil B and power source terminals 15 and 17, essentially no current will flow when the emitter-collector circuit presents a high impedance to the power sources. This would be the condition when no signal voltage is applied across the input terminals 20 and 22.

Therefore, a flow of current through one of the write head windings may be produced by the application of a potential across input terminals 10—12 or 20—22 which lowers the impedance of the respective emitter-collector circuit. With PNP junction transistors in the circuit as shown, a negative potential applied to the base will forward bias the emitter-base junction and result in a flow of current through the respective windings.

Since it is essential that no current flow in either winding unless it is desired to record information, means have been provided to effectively short circuit both windings during the periods when no information is being presented to input terminals 10—12 or 20—22.

When information is not to be recorded, a circuit not shown applies a safety "on" signal at terminal 24. Resistor 25 connects terminal 24 to base 26 and base 27 of transistors $T_3$ and $T_4$ respectively. Therefore, when terminal 24 is negative as a result of a safety "on" signal, base 26 is negative with respect to emitter 28 and transistor $T_3$ will conduct heavily between emitter 28 and collector 29. Similarly, transistor $T_4$ will also conduct heavily between emitter 30 and collector 31.

When the safety "on" signal drives transistors $T_3$ and $T_4$ to saturation the emitter-collector resistance is less than ten percent of the resistance of the write coil. Since transistors $T_3$ and $T_4$ are in shunt circuit with windings A and B together with the associated control transistors $T_1$ and $T_2$, it follows that the safety "on" signal lowers the impedance of one side of the shunt circuit and effectively limits the current which can flow in windings A or B. By properly proportioning the impedance of windings A and B, transistors $T_3$ and $T_4$ can limit current flow through the windings to a value which is below the minimum required to appreciably alter the magnetic condition of the recording medium. By applying the safety "on" signal to terminal 24 at all times when it is desired to guard against loss of recorded information, protection against failure of transistors $T_1$ and $T_2$ is insured.

Protection is also provided to recorded data in the case of a failure of one or more of the power supplies, since if any supply fails in a manner that would turn on $T_1$ and $T_2$ it would also turn on $T_3$ and $T_4$, providing safety.

Also, if all power supplies should fail at one time $T_3$ and $T_4$ would be the last transistors to turn off since they are power transistors with turn off times of approximately twenty-five microseconds. $T_1$ and $T_2$ are high speed switching transistors that turn off in less than one microsecond.

It is essential that some means be provided for monitoring the condition of protective transistors $T_3$ and $T_4$ since the loss of protection must be made known immediately.

Should either transistor $T_3$ or $T_4$ fail to saturate in response to the safety "on" signal, collector 29 or 31 will remain at a negative potential. Thus the combination of a safety "on" signal and a negative potential at collectors 29 or 31 as a result of the failure of transistor $T_3$ or $T_4$ to saturate can be used to feed a simple "and" circuit to indicate the loss of protection.

Means for indicating a loss of protection includes transistors $T_5$, $T_6$, and $T_7$ interconnected so that a failure alarm is provided when transistor $T_5$ and either transistor $T_6$ or $T_7$ is conducting.

The base 33 of transistor $T_5$ is connected to terminal 24 through resistor 34. Since this terminal is at a negative potential for safety "on" condition, transistor $T_5$ will present a low impedance from collector 35 to emitter 36 during the safety "on" condition.

Transistors $T_6$ and $T_7$ have bases 37 and 38 connected through resistors 39 and 40 to the negative potential side of write windings A and B, respectively. In the event that either transistor $T_3$ or $T_4$ fails to conduct to saturation in response to a safety "on" signal the potential at the negative side of the write winding will remain at a negative level. When either of bases 37 or 38 is held at the negative potential of terminal 7 transistor $T_6$ or $T_7$, as the case may be, will conduct from emitter 41 or 42 to collector 43 or 44, respectively.

This conduction through transistors $T_5$ and either $T_6$ or $T_7$ causes a voltage drop across resistor 45 which changes failure alarm terminal 46 from a negative to essentially ground potential. The change in voltage at terminal 46 can be used to trigger a suitable alarm to indicate protection failure.

As a further description of the invention assume that transistor $T_1$ has shorted from emitter 4 to collector 6 causing a high current to flow through winding A. This would normally result in a loss of the recorded information which happened to be under the head at the time of failure. However, with my invention the safety "on" signal is present at all times when it is not desired to write. This signal causes transistor $T_1$ to be bypassed by the low impedance emitter 28-collector 29 circuit of transistor $T_3$, thereby reducing current through winding A to an acceptable value.

When the safety "off" signal is present, transistors $T_3$ and $T_4$ are biased into the cut-off region so they do not interfere with the control of current through windings A or B by transistors $T_1$ or $T_2$. In the case where transistor $T_1$ has failed, current through winding A will jump to a maximum value when the safety "on" signal changes to "off." The safety "off" signal will be given only when it is desired to write, in which case it is of no consequence that the recording medium is erased, since it was intended that the data previously recorded be changed. The failure of the head to write as intended can be easily detected by any of the well known means such as an adjacent read head.

While the invention has been particularly shown and described with reference to a preferred embodiment thereof, it will be understood by those skilled in the art that various changes in form and details may be made therein without departing from the spirit and scope of the invention.

What is claimed is:

1. In a magnetic recording system having a transducer and a first transistor in series circuit, protective means for said system comprising a second transistor having first, second and third electrodes, circuit means connecting said first and second electrodes in parallel circuit with said transducer, means for applying a safety "on" signal to said third electrode to lower the impedance between said first and second electrodes thereby shunting said transducer, means for developing an alarm signal responsive to the failure of said second transistor to respond to said safety signal comprising, a logical "and" circuit having an output terminal and a plurality of input terminals, said "and" circuit developing said alarm signal at said output terminal in response to the presence of predetermined conditions at said input terminals, circuit means connecting a first of said input terminals to be energized by said safety signal, circuit means connecting a second of said input terminals to a check point on said transducer circuit, said check point located to change from a first to a second potential in response to conduction through said second transistor, said "and" circuit developing said alarm signal in response to the simultaneous presence of said protective signal and said first potential at said inputs.

2. In a magnetic recording system having a transducer winding for coacting with a magnetizable recording medium, a first transistor having a pair of output electrodes and a control electrode, means connecting one of said first transistor output electrodes to said winding to form a series circuit including said winding and said output electrodes, protective means comprising a second transistor having first, second and third electrodes, circuit means connecting said first and second electrodes to the extremities of said series circuit, means for applying a protective signal to said third electrode to provide a low impedance condition between said first and second electrodes to limit the current through said series circuit to a value less than that required to alter the condition of said recording medium, means for indicating the failure of said second transistor to respond to said protective signal comprising circuit means for developing an alarm signal in response to predetermined input signals, means connecting said circuit means to be responsive to said protective signal as an input signal, means connecting said circuit means to be responsive to the potential of a check point on said series circuit as an input signal, said check point being located to provide a predetermined potential in response to conduction through said second transistor, said circuit means being operative to develop said alarm signal in response to simultaneous presence of said protective signal and said predetermined potential at said check point.

References Cited in the file of this patent

UNITED STATES PATENTS

| | | |
|---|---|---|
| 2,643,359 | Shenk | June 23, 1953 |
| 2,776,420 | Woll | Jan. 1, 1957 |
| 2,832,900 | Ford | Apr. 29, 1958 |
| 2,900,215 | Schoen | Apr. 18, 1959 |
| 2,906,941 | Brolin | Sept. 29, 1959 |
| 3,030,554 | Leeson | Apr. 17, 1962 |